US012409994B2

(12) United States Patent
Takeda et al.

(10) Patent No.: US 12,409,994 B2
(45) Date of Patent: Sep. 9, 2025

(54) PACKAGING MATERIAL

(71) Applicants: UACJ Corporation, Tokyo (JP); UACJ Foil Corporation, Tokyo (JP)

(72) Inventors: Tomoki Takeda, Tokyo (JP); Tomohiro Maeda, Tokyo (JP); Hisaya Kato, Tokyo (JP)

(73) Assignees: UACJ Corporation, Tokyo (JP); UACJ Foil Corporation, Tokyo (JP)

( * ) Notice: Subject to any disclaimer, the term of this patent is extended or adjusted under 35 U.S.C. 154(b) by 98 days.

(21) Appl. No.: 18/554,407

(22) PCT Filed: Apr. 7, 2022

(86) PCT No.: PCT/JP2022/017244
§ 371 (c)(1),
(2) Date: Oct. 6, 2023

(87) PCT Pub. No.: WO2022/224834
PCT Pub. Date: Oct. 27, 2022

(65) Prior Publication Data

US 2024/0182221 A1 Jun. 6, 2024

(30) Foreign Application Priority Data

Apr. 19, 2021 (JP) ................................ 2021-070433

(51) Int. Cl.
*B65D 75/20* (2006.01)
*B65D 33/34* (2006.01)
(Continued)

(52) U.S. Cl.
CPC ............ *B65D 75/20* (2013.01); *B65D 33/34* (2013.01); *B65D 75/5827* (2013.01); *A61J 1/03* (2013.01)

(58) Field of Classification Search
CPC .. A61J 1/03; A61J 1/035; B65D 33/18; B65D 33/34; B65D 75/20; B65D 75/58; B65D 75/5827
(Continued)

(56) References Cited

U.S. PATENT DOCUMENTS

2007/0125868 A1* 6/2007 Hong ........................ A61J 1/03 235/492
2021/0272058 A1* 9/2021 Kourtis .................. A61J 1/035

FOREIGN PATENT DOCUMENTS

JP H02257960 A 10/1990
JP H08301301 A 11/1996
(Continued)

OTHER PUBLICATIONS

International Search Report and Written Opinion of the International Searching Authority corresponding to counterpart International Patent Application PCT/JP2022/017244 mailed Jun. 21, 2022, with English translation.
(Continued)

*Primary Examiner* — Bryon P Gehman
(74) *Attorney, Agent, or Firm* — Renner, Otto, Boisselle & Sklar, LLP

(57) ABSTRACT

A sheet including a pre-storing portion to be a storing portion and a wiring pattern disposed on the sheet are included. The wiring pattern is disposed such that ends of the wiring pattern are disposed on one side along one direction and the wiring pattern is disposed along peripheral edges of the pre-storing portion so as to be along peripheral edges of the storing portion on three sides other than the one side when the storing portion is formed. The sheet is transparent or semitransparent and includes a pre-sealing portion around the pre-storing portion. The wiring pattern is disposed at
(Continued)

peripheral edges of the pre-storing portion on the three sides and disposed on the pre-sealing portion.

8 Claims, 11 Drawing Sheets

(51) Int. Cl.
*B65D 75/58* (2006.01)
*A61J 1/03* (2023.01)

(58) Field of Classification Search
USPC .................................... 206/459.1; 383/38–40
See application file for complete search history.

(56) References Cited

FOREIGN PATENT DOCUMENTS

| | | | |
|---|---|---|---|
| JP | 2013/166590 | A | 8/2013 |
| JP | 2020-189636 | A | 11/2020 |
| WO | 2020/003105 | A1 | 1/2020 |

OTHER PUBLICATIONS

Japanese Office Action corresponding to counterpart Japanese patent application No. 2021-070433; date Jun. 6, 2024, with English translation.

* cited by examiner

PACKAGING MATERIAL

This application is a national phase of International Application No. PCT/JP2022/017244 filed Apr. 7, 2022, which claims priority to Japanese Application No. 2021-070433 filed Apr. 19, 2021, each of which is incorporated herein by reference in its entirety.

TECHNICAL FIELD

The present technology relates to a packaging material.

BACKGROUND ART

In pharmacotherapy, it is important that patients surely take prescribed medication. The opening detection technology of detecting opening of medicine packaging that helps patients to take medicine as prescribed has been known. For example, Patent Document 1 discloses an opening detection packaging material that includes circuit lines on an enclosing sheet of a press through pack (PTP) packaging material. The PTP packaging material stores tablets separately one by one. The circuit line extends to cross each medicine storing portion and the circuit line is broken together with the enclosing sheet by pressing the storing portion to take out the medicine. The opening of the packaging material can be detected based on a change in an electrical signal caused by the breakage of the circuit pattern.

The PTP packaging material includes a storing section including storing portions of a recessed shape and the enclosing sheet that encloses the storing portions. The storing section generally is generally configured by forming the storing portions having a shape along the shape of the tables on a thin synthetic resin sheet. Therefore, a target breaking position for opening can be easily specified on the enclosing sheet and the opening can be detected with high accuracy. An aluminum foil that is opaque and has high quality in moisture proof properties, gas barrier properties, and light blocking properties is generally used as the enclosing sheet. Information regarding the stored tablets is printed on the enclosing sheet.

PRIOR ART DOCUMENT

Patent Document

Patent Document 1: Japanese Unexamined Patent Application Publication No. 2020-189636

SUMMARY OF THE INVENTION

Problem to be Solved by the Invention

As the medicine packaging material, a subdivided bag (one kind of an inner bag) including storing portions each of which can store a dose of powder medicine has been known. The subdivided bag is formed by folding a packaging paper and bonding a peripheral portion. When several kinds of medicines are prescribed, it has been highly demanded to store powder medicine and tablets, which are to be taken at a same time, in each storing portion of the subdivided bag to reduce opportunities to forget to take medicine and take medicine erroneously and to reduce the loads of opening stored bags. However, the subdivided bag is designed with a relatively simple design to be able to store various kinds of medicines, medicines having various shapes, and various number of medicines and therefore, each storing portion has a large area. With such a configuration, it is difficult to specify the opening position and detect the opening.

The present invention was made in view of the above circumstances. An object is to provide a packaging material that is effectively used as a packaging paper for forming a subdivided bag whose opening can be detected.

Means for Solving the Problem

The inventors applied the technology disclosed in Patent Document 1 to a subdivided bag. As illustrated in FIG. 11, a user does not necessarily tear the subdivided bag along a breaking line (may tear the bag along a line X1 or a line X2) when taking a medicine. Therefore, it was found that the opening of the subdivided bag is less likely to be detected appropriately with the technology disclosed in Patent Document 1.

(1) As a result of earnest consideration, a packaging material that is used for forming a subdivided bag including storing portions storing objects is provided with the present technology. The packaging material includes a sheet including a pre-storing portion to be the storing portion, and a wiring pattern disposed on the sheet. The wiring pattern is disposed such that ends of the wiring pattern are disposed on one side along one direction and the wiring pattern is disposed with respect to the pre-storing portion so as to be along peripheral edges of the storing portion on three sides other than the one side with the storing portion being formed.

(2) In one embodiment of the present technology, in addition to the configuration of (1), the sheet may be transparent or semitransparent and include a pre-sealing portion around the pre-storing portion, and the wiring pattern may be disposed at peripheral edges of the pre-storing portion on the three sides and disposed on the pre-sealing portion.

(3) In one embodiment of the present technology, in addition to the configuration of (1) or (2), the subdivided bag may have a belt shape and the storing portion may include storing portions that are arranged along the one direction. The sheet may have a belt shape and the pre-storing portion includes pre-storing portions that are arranged along the one direction. The wiring pattern may be disposed such that the ends of the wiring pattern are disposed on the one side along the one direction and the wiring pattern is disposed along peripheral edges of the storing portions on the three sides when the storing portions are formed. When the storing portions are formed, the wiring pattern may include a first line that is disposed on one side with respect to the storing portions in a width direction that crosses the one direction and a second line that is disposed on another side in the width direction. The first line and the second line may extend along the one direction. At least one of the first line and the second line may be a common line that is commonly disposed along peripheral edges of the storing portions.

(4) In one embodiment of the present technology, in addition to the configuration of one of (1) to (3), a breaking line may be between the storing portions that are adjacent to each other when the storing portions are formed and the breaking line may include cut portions at intervals. A narrowest portion of the wiring pattern may have a width that is greater than a length of the cut portion.

(5) In one embodiment of the present technology, in addition to the configuration of one of (1) to (4), the packaging material may further include pre-sealing portions around the pre-storing portions. The sheet may include a folding line extending along the one direction in a middle of the sheet with respect to a width direction that crosses the one direction. The sheet may be divided by the folding line into a first section that is on one side and a second section that is on another side with respect to the width direction. With the sheet being folded in half along the folding line and the pre-sealing portion in the first section and the pre-sealing portion in the second section being bonded, the storing portions may be formed.

(6) In one embodiment of the present technology, in addition to the configuration of one of (1) to (5), the packaging material may further include pre-sealing portions around the pre-storing portions. With the sheet and another sheet being overlapped, the pre-sealing portions of the sheets may be bonded to each other and the storing portions may be formed.

Effects of the Invention

According to the present technology, a packaging material that is effectively used as a packaging paper for producing a subdivided bag with whose opening of the bag can be detected is provided.

MODES FOR CARRYING OUT THE INVENTION

First Embodiment

Figure 1:
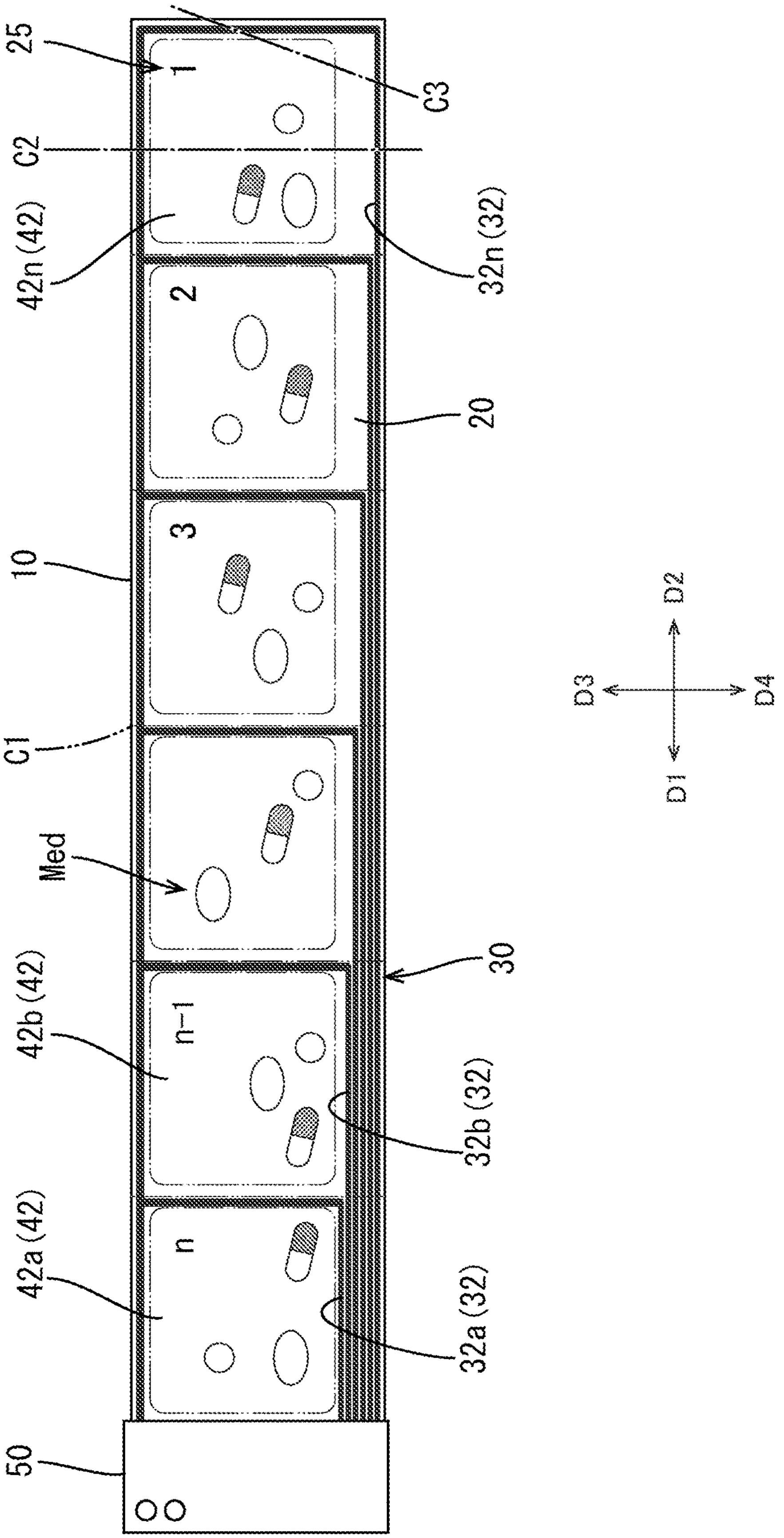
FIG. 1 is a subdivided bag that is formed with a packaging material according to one embodiment and whose opening is being detected.
Figure 2:
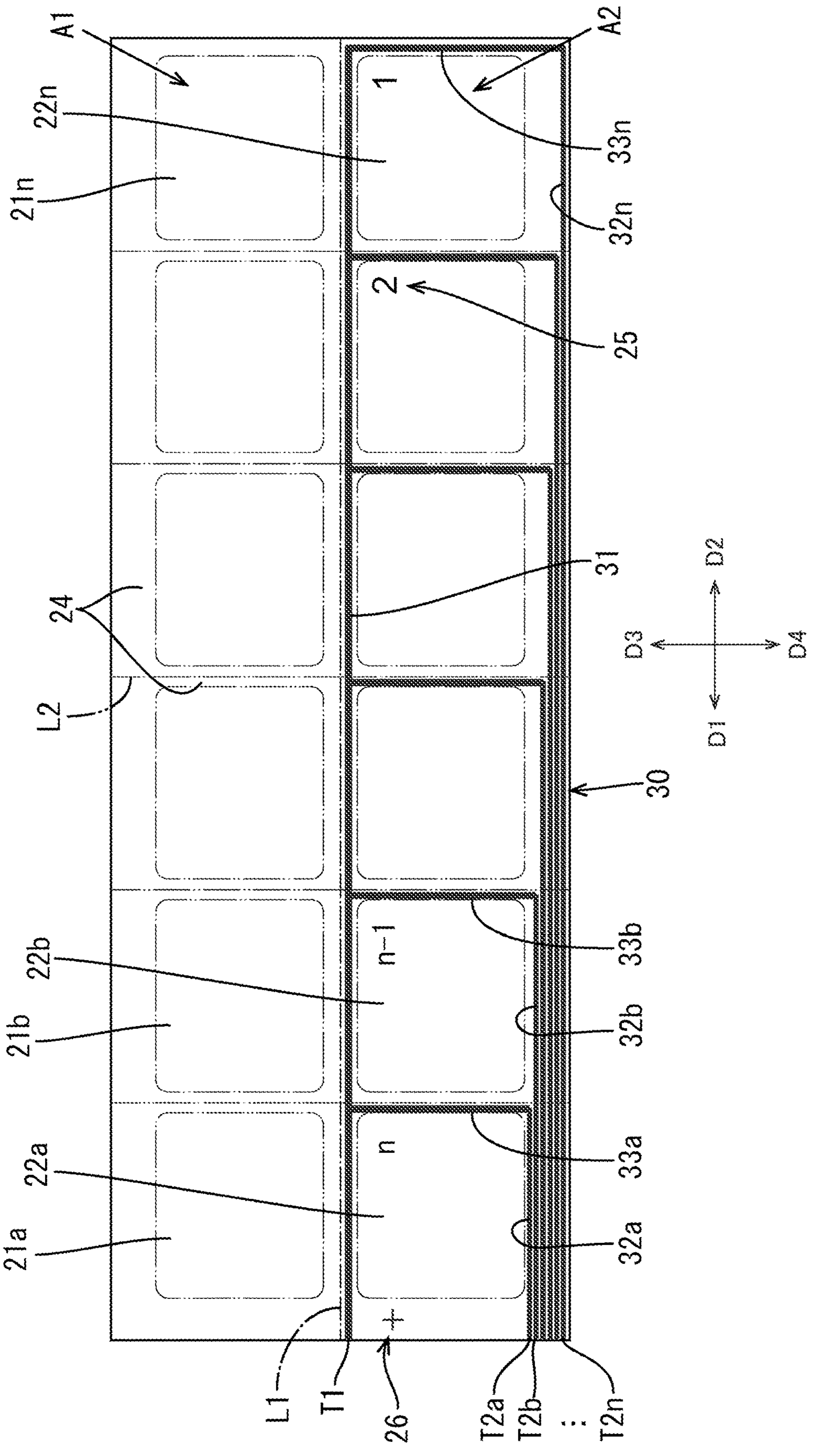
FIG. 2 is a plan view of the packaging material of FIG. 1.

First, a packaging material according to one embodiment will be generally described with reference to FIGS. 1 to 6. In FIG. 1, opening of a subdivided bag 40 that is formed with using a packaging material 10 is detected. The subdivided bag 40 includes storing portions 42*a*, 42*b*, . . . 42*n* and multiple medicines Med that are to be taken at a same timing are stored in each of the storing portions 42. Breaking lines C1 are between the storing portions 42 and the subdivided bag 40 can be separated into the storing portions 42 along the breaking lines C1. FIG. 2 illustrates the packaging material 10 of this embodiment and is a net view of the subdivided bag 40 in FIG. 1. The packaging material 10 includes a sheet 20 and a wiring pattern 30. Symbols D1 and D2 in the drawings represent a first direction and a second direction, respectively, that are along an elongated direction (one example of one direction) of the packaging material 10. The second direction is opposite from the first direction. Symbols D3 and D4 represent a third direction and a fourth direction, respectively, that are along a width direction. The width direction is perpendicular to the elongated direction. The fourth direction is opposite from the third direction.

The sheet 20 is a material for producing the subdivided bag 40. The sheet 20 has a rectangular belt-like shape. The sheet 20 of this embodiment is folded in half along a center line with respect to the width direction to produce the subdivided bag 40. A folding line L1 representing a folding position (folding line) at which the sheet 20 is folded is defined at a middle of the sheet 20 with respect to the width direction. In the following, the sheet 20 includes a first section A1 and a second section A2 that are defined by the folding line L1. The first section A1 is on the third direction side and the second section A2 is on the fourth direction side with respect to the width direction.

Figure 3:
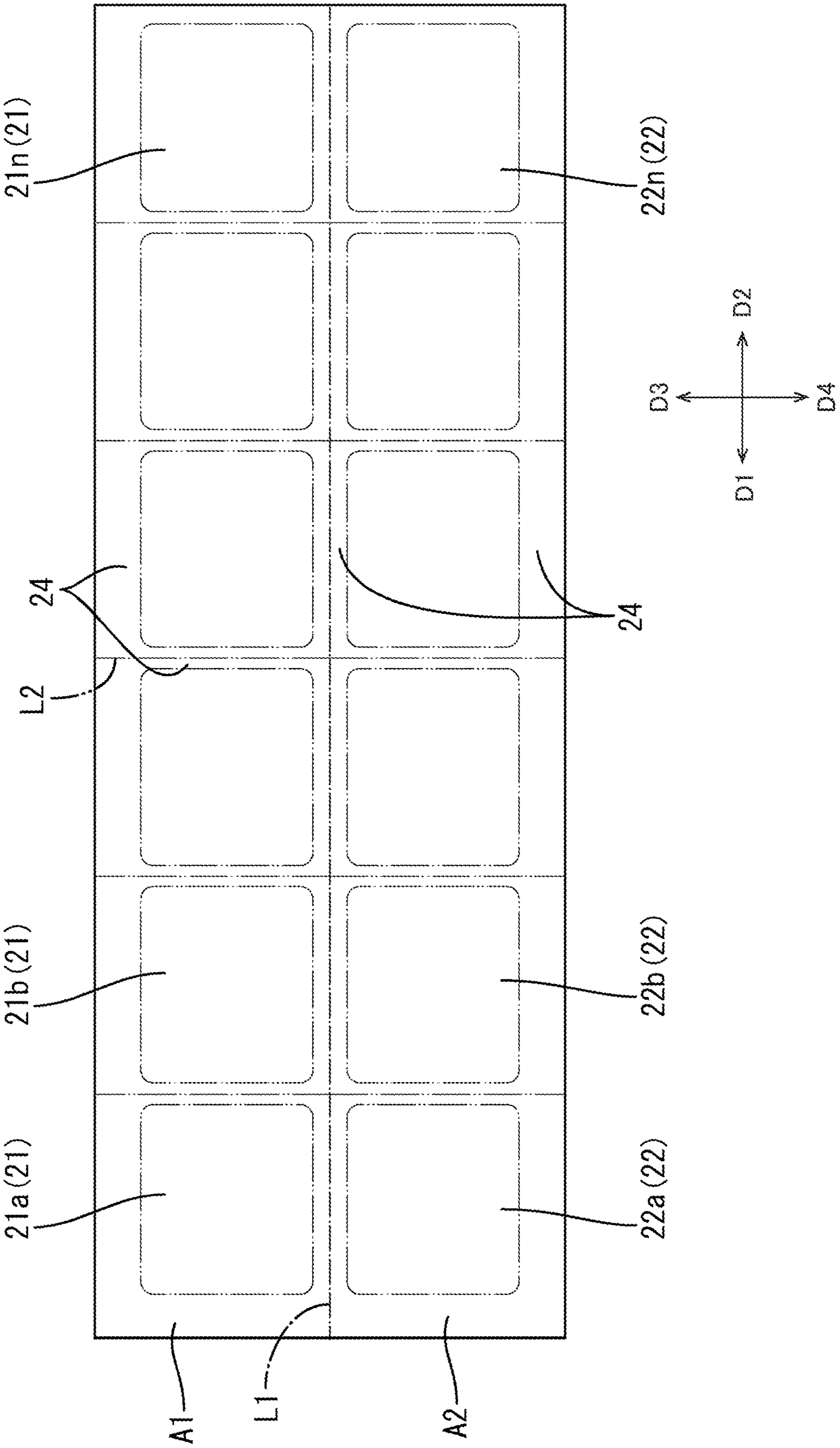
FIG. 3 is a plan view of a sheet of the packaging material of FIG. 1.

Pre-storing portions 21*a*, 21*b* . . . 21*n* are defined along the elongated direction in the first section A1. Pre-storing portions 22*a*, 22*b*, . . . 22*n* are defined along the elongated direction in the second section A2. The number of pre-storing portions 21*a*, 21*b*, . . . 21*n* and pre-storing portions 22*a*, 22*b*, . . . 22*n* is n. n is a natural number that is 1 or greater and n is 6 in the example in FIG. 1. The pre-storing portions 21*a*, 21*b*, . . . 21*n* and the pre-storing portions 22*a*, 22*b*, . . . 22*n* that are adjacent to each other with respect to the width direction, respectively, are disposed symmetrically with respect to the folding line L1 and have a same shape as the storing portions 42*a*, 42*b*, . . . 42*n*. The pre-storing portions 21*a*, 21*b*, . . . 21*n* and the pre-storing portions 22*a*, 22*b*, . . . 22*n* that are arranged in the elongated direction have a same shape as the storing portions 42*a*, 42*b*, . . . 42*n*. Each of the pre-storing portions 21*a*, 21*b*, . . . 21*n*, the pre-storing portions 22*a*, 22*b*, . . . 22*n*, and the storing portions 42*a*, 42*b* . . . 42*n* normally has a same shape. However, the pre-storing portions 21*a*, 21*b*, . . . 21*n* (and the storing portions 42*a*, 42*b*, . . . 42*n*) that are arranged in the elongated direction may have different shapes. As illustrated in FIGS. 2 and 3, the pre-storing portions 21*a*, 21*b*, . . . 21*n* according to this embodiment have a rectangular shape having four round corners. Each of the pre-storing portions 21*a*, 21*b*, . . . 21*n* is surrounded by a pre-sealing portion 24. One end portion of the sheet 20 with respect to the first direction is not the pre-sealing portion 24 but defined as a mount section 28 that is for mounting the packaging material 10 on an opening detector 50, which will be described later.

In this description, when each of the pre-storing portions 21*a*, 21*b*, . . . 21*n*, the pre-storing portions 22*a*, 22*b*, . . . 22*n*, and the storing portions 42*a*, 42*b*, . . . 42*n* is not necessarily distinguished from each other, the alphabets at the ends of the symbols are omitted and the components are referred to as the pre-storing portion 21, the pre-storing portion 22, and the storing portion 42. Second lines 32*a*, 32*b*, . . . 32*n* (second lines 32), third lines 32*a*, 32*b*, . . . 32*n* (second lines 32), and second terminals T2*a*, T2*b*, . . . T2*n* (second terminals T2) may be described similarly.

The pre-sealing portions 24 that are between the pre-storing portions 21 and between the pre-storing portions 22 that are adjacent to each other in the elongated direction have a relatively small dimension measured in the elongated direction and are narrow. The pre-sealing portion 24 that is at a middle of the sheet 20 with respect to the width direction has a relatively small dimension measured in the width direction and is narrow. The pre-sealing portions 24 that are at two edges of the sheet 20 with respect to the width direction have a relatively large dimension measured in the width direction and are wide. Pre-breaking lines L2 where the breaking lines C1 are formed are at borders between the pre-storing portions 21 and between the pre-storing portions 22 that are adjacent to each other in the elongated direction (in other words, on the pre-sealing portions 24 that are between the pre-storing portions 21 and between the pre-storing portions 22 that are adjacent to each other in the elongated direction). The folding line L1 is on a middle of the pre-sealing portion 24, which is on a middle of the sheet 20 with respect to the width direction, with respect to the width direction. With the sheet 20 being folded along the folding line L1, the pre-storing portions 21*a*, 21*b*, . . . 21*n* and the pre-storing portions 22*a*, 22*b*, . . . 22*n* overlap, respectively. With the folded sheet 20 being bonded at the pre-sealing portions 24, four side portions of each of the pre-storing portions 21*a*, 21*b*, . . . 21*n* and the pre-storing portions 22*a*, 22*b*, . . . 22*n* are closed. Accordingly, the sheet 20 includes closed storing portions 42*a*, 42*b*, . . . 42*n*. The number of storing portions 42 is n. The shape of the storing portions 42*a*, 42*b*, . . . 42*n* is not necessarily determined by the shape of the medicine Med, which is an object to be stored, and is designed so as to be large enough for the size (a plan shape) of the medicine Med, which is an object to be stored.

Various kinds of sheet members made of soft material may be used as the sheet 20 and various sheets that can be thermally bonded with heat pressing are preferably used. One preferable example of the sheet 20 is a layered film that includes semitransparent or transparent thin member (may be a paper) such as glassine and cellophane as a base and an adhesive layer made of thermoplastic resin on a back surface of the base. The base and the adhesive layer are configured as one integral component. Thermoplastic resin may have a softening point or a melting point lower than the heating temperature (for example, about 100° C. to 150° C.) in a sealing process of producing the packaging material such that the thermoplastic resin is softened or melted at the heating temperature. More specifically, examples of the thermoplastic resin may include polyethylene, polypropylene, polystyrene, polyvinyl chloride, and polyethylene terephthalate. The thermoplastic resin is not limited to the above examples. One of the examples may be used as the thermoplastic resin or two or more examples may be combined. With the sheet 20 being semitransparent or transparent as a whole, the objects stored in the subdivided bag 40 can be seen from outside. The sheet 20 has a thickness of about 100 μm or less (60 μm or less, and 40 μm or less typically) and preferably has strength so as to be torn by a human's hand. The sheet 20 may be preferably a resin coated paper having a belt shape, which is a so-called medical packaging paper.

In the present technology, "not having air-permeable properties" means that air-permeability is not observed with the air-permeability test defined by JIS P8117:2009.

The wiring pattern 30 is a component for detecting opening of the subdivided bag 40 that is formed from the packaging material 10. The wiring pattern 30 is a component that is broken together with the sheet 20 when the sheet 20 is torn to open the storing portion 42. The wiring pattern 30 has electrically conductive properties and loses the electrically conductive properties (is disconnected) when the wiring pattern 30 is broken. The wiring pattern 30 of this embodiment is disposed on a surface of the sheet 20. The wiring pattern 30 includes a first line 31, the second lines 32*a*, 32*b*, . . . 32*n* (the second lines 32), and third lines 33*a*, 33*b*, . . . 33*n* (third lines 33). The number of second lines 32 and the number of third lines 33 is n.

The first line 31 extends along the elongated direction in one edge portion of the second section with respect to the width direction. The first line 31 is on the pre-sealing portion 24 and is slightly away from the folding line L1 of the sheet 20 in the fourth direction. The first line 31 extends substantially straight to a second direction-side edge of the n-th pre-storing portion 22*n* from a first direction-side end. A first terminal T1 is disposed at the first direction-side end (in the mount section 28) of the first line 31. The first terminal T1 is one example of an end of the first line 31. The first line 31 is disposed as close as possible to the folding line L1 (for example, within an area of 5 mm or smaller from the folding line L1). With the first line 31 being disposed on the pre-sealing portion 24, the first line 31 does not block a person from seeing the object stored in the storing portion 42. Therefore, high visibility of the object in the storing portion 42 can be maintained.

The second lines 32 extend along the elongated direction in another edge portion of the second section with respect to the width direction. The second lines 32 are in the pre-sealing portion 24 that is included in a fourth direction-side edge portion of the sheet 20. The second lines 32*a*, 32*b*, . . . 32*n* respectively extend substantially straight to second direction-side edges of the corresponding n-th pre-storing portions 22*n* from the first direction-side end. The second terminals T2*a*, T2*b*, . . . T2*n* (second terminal T2) are disposed at the first direction-side ends (in the mount section 28) of the second lines 32*a*, 32*b*, . . . 32*n*, respectively. The second terminals T2 are one example of ends of the second lines 32. The second lines 32 of this embodiment are disposed in the pre-sealing portion 24; however, the second lines 32 may be partially disposed on the pre-storing portions 22. With the second lines 32 being disposed on the pre-sealing portion 24, the second lines 32 do not block a person from seeing the object stored in the storing portion 42. Therefore, high visibility of the object in the storing portion 42 can be maintained.

The second lines 32*a*, 32*b*, . . . 32*n* are spaced from each other so as not to be contacted and overlapped with each other. For example, the second line 32*a* of the second lines 32*a*, 32*b*, . . . 32*n* extends around the storing portion 42*a* that is at the first direction-side end. The second line 32*a* is closest to a middle (in other words, closest to the folding line L1) with respect to the width direction and has a relatively small length from the end. The lengths of the second lines 32 from the end become relatively longer and the second lines 32 are disposed on an outer side (in other words, on a fourth direction side) as they are closer to the second line 32*n* that surrounds the storing portion 42*n* at a second direction-side end.

The third lines 33*a*, 33*b*, . . . 33*n* connect the first line 31 and the respective second lines 32*a*, 32*b*, . . . 32*n*. The third lines 33 are disposed on the pre-sealing portion 24 that is between the adjacent pre-storing portions 22. Each third line 33 extends to cross the second section A2 along the width direction in a second-direction side edge portion of each n-th pre-storing portion 22*n* from the first-direction side end. The second lines 32*a*, 32*b*, . . . 32*n* and the third lines 33*a*, 33*b*, . . . 33*n* are, respectively, connected to form an L shape. The first line 31, the second lines 32*a*, 32*b*, . . . 32*n*, and the third lines 33*a*, 33*b*, . . . 33*n* are disposed to surround the storing portions 42*a*, 42*b*, . . . 42*n*, respectively, from three sides (the second direction, the third direction, the fourth direction) except for the first direction. The first line 31 is a common line that is commonly connected to the second lines 32 and the third lines 33 in the wiring pattern 30 such that the storing portions 42 are surrounded by the first line 31, the second lines 32, and the third lines 33.

The widths of the first line 31, the second lines 32, and the third lines 33 are not particularly limited and may be set any values as long as stable electrical conductivity can be confirmed between the first terminal T1 and the second terminals T2. With respect to the improvement in visibility of the stored object, the first line 31, the second lines 32, and the third lines 33 may be preferably narrow. For increasing the area occupied by the pre-storing portions 21, 22 (the storing portions 42) and decreasing the area occupied by the pre-sealing portions 24 in an entire area of the sheet 20, the lines are preferable to be narrow and the second lines 32 that are arranged parallel to each other in the pre-sealing portion 24 are particularly preferable to be narrower. For example, the width of the first line 31 is preferably 5 mm or less, typically 3 mm or less, and for example, preferably 1.5 mm or less. The width of the second lines 32 is preferably 2 mm or less, typically 1.5 mm or less, and for example, preferably 1 mm or less. The width of the third lines 33 is preferably 5 mm or less, typically 3 mm or less, and for example, preferably 1.5 mm or less. The widths of the first line 31, the second lines 32, and the third lines 33 may be preferably 0.5 mm or greater (for example, 0.625 mm or greater).

Figure 4:
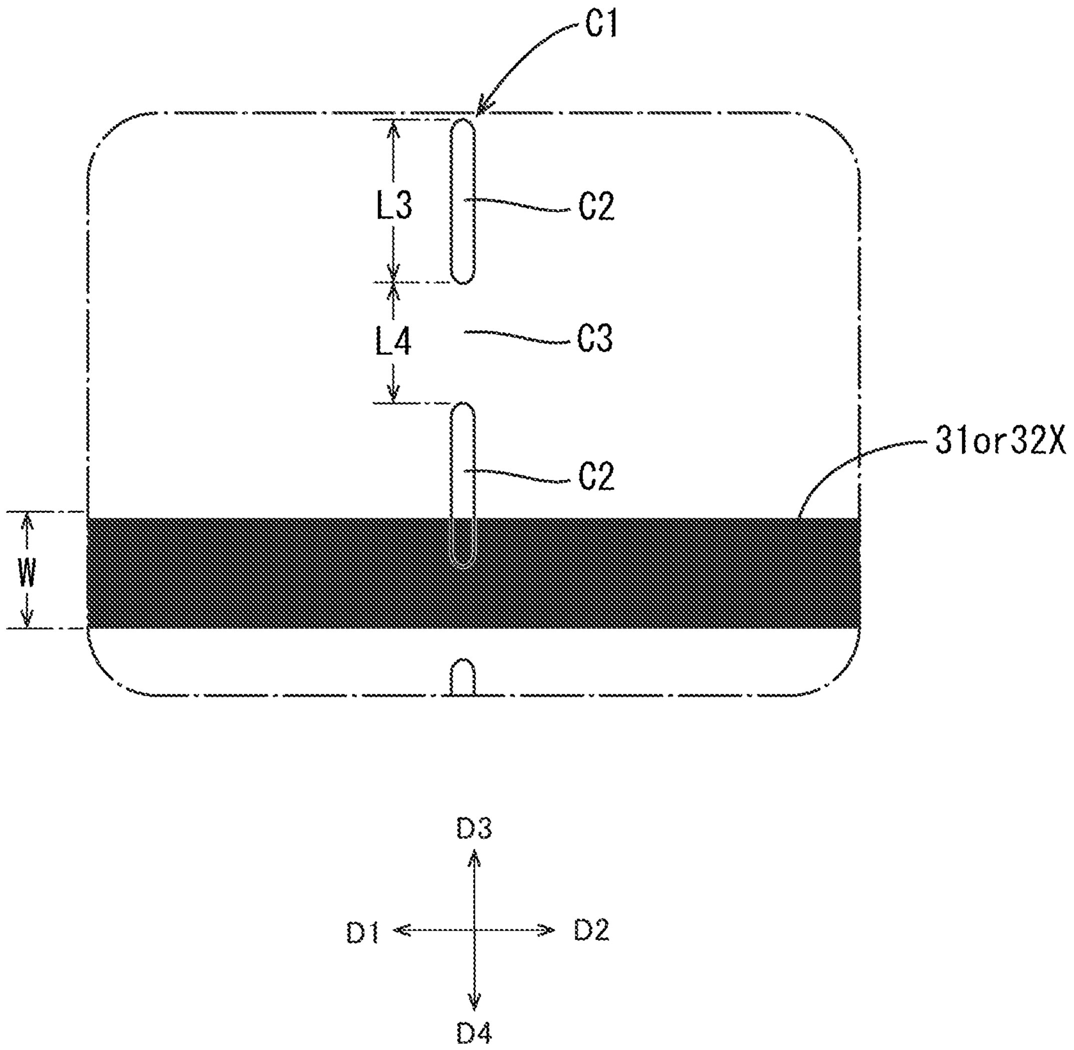
FIG. 4 is a magnified view of a portion of the subdivided bag near a breaking line.

The breaking lines C1 are formed at the positions of the pre-breaking lines L2 when the subdivided bag 40 is formed from the packaging material 10. As previously described, the pre-breaking lines L2 extend to cross the sheet 20 in the width direction. Therefore, in the subdivided bag 40, the breaking lines C1 may cross the first line 31 and the second lines 32. For example, as illustrated in FIG. 1, the breaking lines C1 extend to cross the first line 31 and the second lines 32*b*, . . . 32*n*. As illustrated in FIG. 4, for example, the breaking line C1 includes cut portions C2 (one example of a cut portion) each of which has a predefined length L3 and continuous portions C3 each having a predefined length L4. The cut portions C2 and the continuous portions C3 are linearly disposed. It is difficult to form the breaking line C1 such that the first line 31 or a first portion 32X is not cut by forming the cut portions C2. The width W of the narrowest portions of the first line 31 and the second lines 32 are preferably greater than the length L3 of the cut portion C2 (W>L3). The width W and the length L3 are preferably defined to satisfy the relation of W≥1.25×L3 and more preferably satisfy the relation of W≥1.5×L3. With the width W being defined as described above, the cut portions C2 of the breaking line C1 can be any position on the pre-breaking line such that the narrowest portions of the first line 31 and the second lines 32 are not completely cut. For example, the width of the narrowest portion of the first line 31 and the width of the narrowest portion of each second line 32 are typically and preferably 0.5 mm or greater, preferably 0.75 mm or greater, and for example, preferably 1 mm or greater. The length L3 of the cut portions C2 is preferably 0.5 mm or greater and may be preferably 2 mm or smaller within the range that the above-described relation can be satisfied.

Such a wiring pattern 30 can be formed by supplying an electrically conductive composition on the surface of the sheet 20 in a pattern form and curing the composition. So-called electrically conductive ink that is obtained by dispersing electrically conductive particles in a vehicle including a binder can be used as the electrically conductive composition. Various kinds of particles (may be formed into powders) of material having good electrically conductive properties such as gold, silver, copper, platinum, aluminum, an alloy thereof, and carbon black may be used as the electrically conductive particles. The electrically conductive particles may have various kinds of shapes such as a spherical shape, a flat plate shape, a polyhedron shape, and a rod shape. The vehicle typically includes a binder and a dispersion medium and the composition and physical properties are adjusted according to the supplying method to be performed.

The method of supplying the electrically conductive component is not particularly limited and may be a supplying method with a dispenser and various kinds of printing methods such as letterpress printing, calendar printing, offset printing, ink jetting printing, and screen printing. A dry-curing method, a heat-curing method, and a sintering method may be used as the method of curing the electrically conductive component as appropriate according to the physical properties of the electrically conductive component to be used.

At least a portion of the wiring pattern 30 is disposed on the pre-sealing portion 24 and is exposed to a predefined heating temperature (determined according to the thickness of the sheet 20 and the material of the adhesive layer, and about 100° C. to 150° C., for example) at which the packaging material 10 is subjected to the heating and pressing process to form the bag. The wiring pattern 30 may preferably have heat resistant properties to keep the physical properties such as the shape and electrically conductive properties during the heating and pressing process for forming the bag. Therefore, the wiring pattern 30 may be preferably made of the electrically conductive composition having heat resistant properties. Examples of such an electrically conductive composition having heat resistant properties include screen inks made by TOYO INK such as RAFS059, RAFS007, RAFS076, RAFS090, and RAFS110S. However, the electrically conductive composition is not necessarily limited to the above examples.

The packaging material 10 according to this embodiment includes opening order marks 25 and a marking 26 on the surface of the sheet 20 in addition to the wiring pattern 30. The opening order marks 25 and the marking 26 may be formed with the electrically conductive component that is same as or similar to that of the wiring pattern 30 at the same time as the wiring pattern 30 is formed. The material of the marks may not be limited to the above one.

The opening order mark 25 is provided on each of the pre-storing portions 22*a*, 22*b*, . . . 22*n* and represents the order by which the storing portions 42 are to be opened. The opening order marks 25 may be symbols representing numbers or the order. Preferable examples of the opening order marks 25 may include Arabic numerals, Roman numerals, numerals with Chinese characters, Hiragana characters, alphabets, and Chinese characters. Arabic numerals are provided on the packaging material 10 of this embodiment as the opening order marks 25. The opening order marks 25 are numbered in an ascending order from the pre-storing portion 22*n* that is on the second direction-side end to the pre-storing portion 22*a* that is on the first direction-side end. This guides a user to open the storing portions 42 of the subdivided bag 40 in a correct order.

The marking 26 is a mark that represents a reference position that is used when the packaging material 10 or the subdivided bag 40 is to be processed with other devices. A type and a shape of the marking 26 are not particularly limited as long as a sheet-shaped object can be positioned at a predefined position. Various marks that can be read by a device to be used such as a packaging device or the opening detector 50 can be used as the marking 26. The marking 26 may be a cross-shaped mark that can be read by an infrared laser, for example. A portion of the wiring pattern 30 or an entire wiring pattern 30 may be used as the marking 26. With the packaging material 10 including such a marking 26, the sheet 20 can be bonded with less deviation from the pre-sealing portions 24 when the bag is formed from the packaging material 10. By forming the marking 26 on the sheet 20 at the same time as the wiring pattern 30 is formed, the relative position of the marking 26 and the wiring pattern 30 can be adjusted strictly and the sheet 20 is effectively bonded such that the wiring pattern 30 is placed on the pre-sealing portion 24 with reference to the marking 26. With the packaging material 10 including such a marking 26, a connection terminal section 51, which will be described later, the first terminal T1 and the second terminals T2 can be contacted more surely when the subdivided bag 40, 10 is connected to the opening detector 50.

The packaging material 10 having such a configuration is folded in half along the folding line L1 such that the surface faces outside and the folded packaging material 10 is inserted in a known packaging device (not illustrated). In the packaging device, the bag is formed with the packaging material 10 being transferred in a forwarding direction that is along the elongated direction. Specifically, in the packaging device, the folded packaging material 10 is opened and the opposing sheet 20 portions are closed and the pre-sealing portions 24 of the sheet 20 are heated and pressed to form the storing portions 42. In the packaging device, when the sheet 20 portions are closed, predefined medicine Med is put in each space between the opposing sheet 20 portions. Thus, multiple kinds of medicines Med to be taken one time are stored in each of the storing portions 42 and the storing portions 42 are sealed. Then, in the packaging device, the breaking lines C1 are formed in the bonded portions, which are between the storing portions 42, by cutting portions of the bonded portions along the width direction with a perforation blade. Thus, the subdivided bag 40 in which a plurality of medicines Med are stored in each storing portion is prepared.

Figure 5:
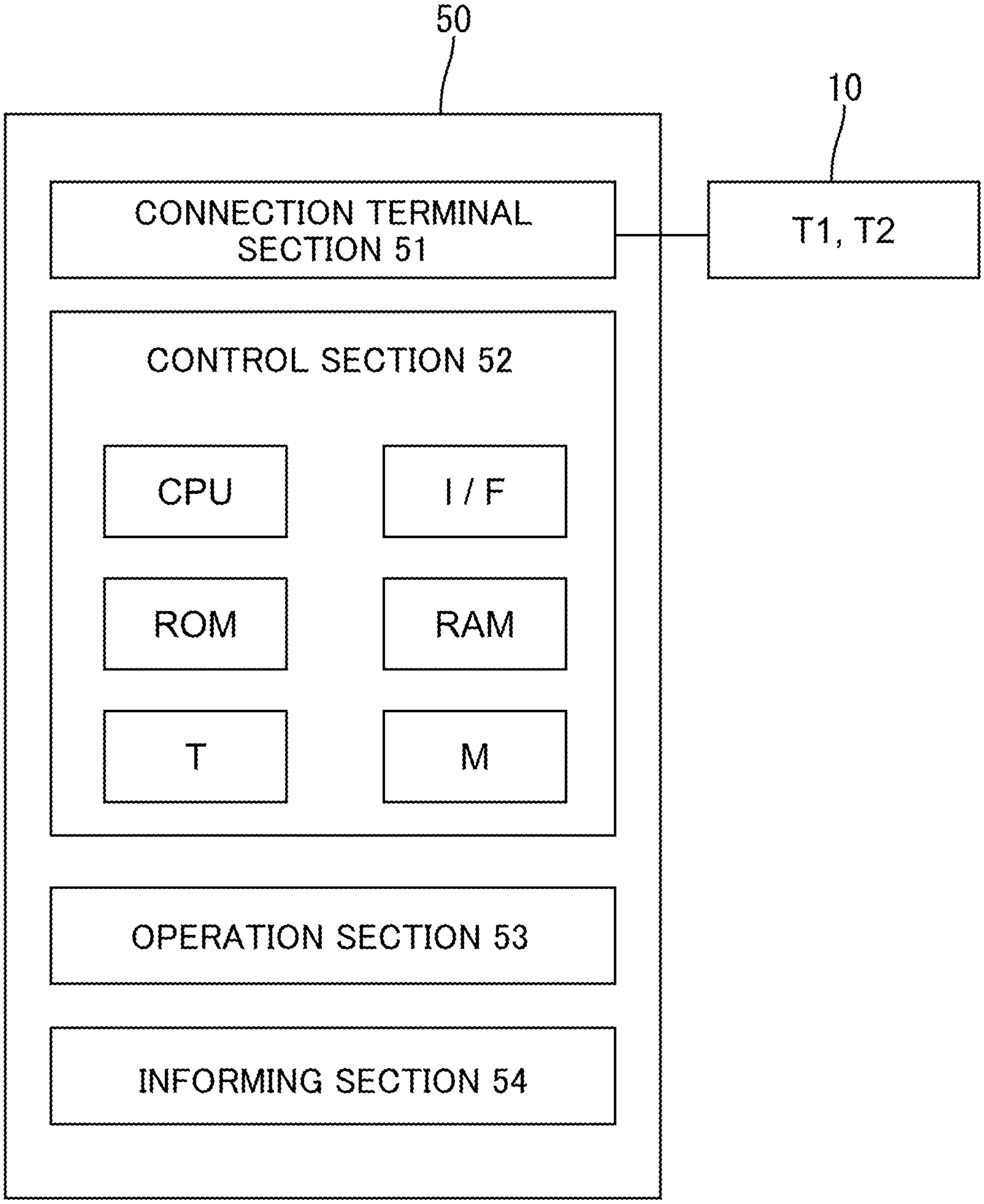
FIG. 5 is a block diagram of an opening detector and the subdivided bag in FIG. 1.

The opening detector 50 is a device for detecting opening of the subdivided bag 40 that is formed with using the packaging material 10. As illustrated in FIG. 5, for example, the opening detector 50 includes the connection terminal section 51, a control section 52, an operation section 53, an informing section 54, and a battery arrangement section 55.

The connection terminal section 51 includes connection terminals that are connected to the first terminal T1 and the second terminals T2 of the subdivided bag 40. The connection terminal section 51 is configured to be electrically connected to the first terminal T1 and the second terminals T2 of the wiring pattern 30 of the subdivided bag 40 when the first direction-side end portion of the subdivided bag 40 is mounted in a predefined mount portion of the opening detector 50.

The control section 52 is configured to detect opening of each of the storing portions 42 of the subdivided bag 40. More specifically, a microcomputer that includes an interface (I/F), a central processing unit (CPU), a read only memory (ROM), a random access memory (RAM), a storing section M storing various kinds of information, and a timer T having a counter function is configured as the control section 52. Various kinds of information are transmitted through the interface. The CPU performs operations according to the commands from the control program. The ROM stores programs that are performed by the CPU. The RAM is used as a working area for developing the program. The ROM, for example, stores a computer program, a data base, and a table that are used for various kinds of processing performed by the opening detector 50. The storing section M, for example, stores ID information related to a user or the opening detector 50, information related to the time when the medicine is to be taken, information used for the various processing performed by the opening detector 50, and information related to the results of the opening detection.

A user sends instructions related to driving to the opening detector 50 via the operation section 53. The operation section 53 of this embodiment includes push buttons and with any one of the push buttons being pressed, the instruction that is predefined corresponding to the pressed push button is sent to the control section 52. For example, by operating one of the push buttons of the operation section 53, the instruction of performing the opening detection of the subdivided bag 40 is sent to the control section 52.

The informing section 54 is a component for informing a user of information related to the driving of the opening detector 50. The informing section 54 of this embodiment includes a buzzer and is configured to make alarm sound with one or more informing patterns. The informing section 54 is configured to make alarm sound with a predefined informing pattern to inform of the time to take medicine when it is the time predefined by a user to take medicine. If the position where the subdivided bag 40 is mounted in the opening detector 50 by a user is not appropriate, alarm sound that informs of a mounting error with a predefined informing pattern can be made. The informing section 54 is configured to make alarm sound to with a predefined informing pattern to inform of completion of detection when the opening detector 50 finishes the opening detection of the subdivided bag 40.

The battery arrangement section 55 is a component for receiving a battery, which is a driving power source for driving the opening detector 50, and is electrically connected to the control section 52 and the informing section 54 to supply power.

Figure 6:
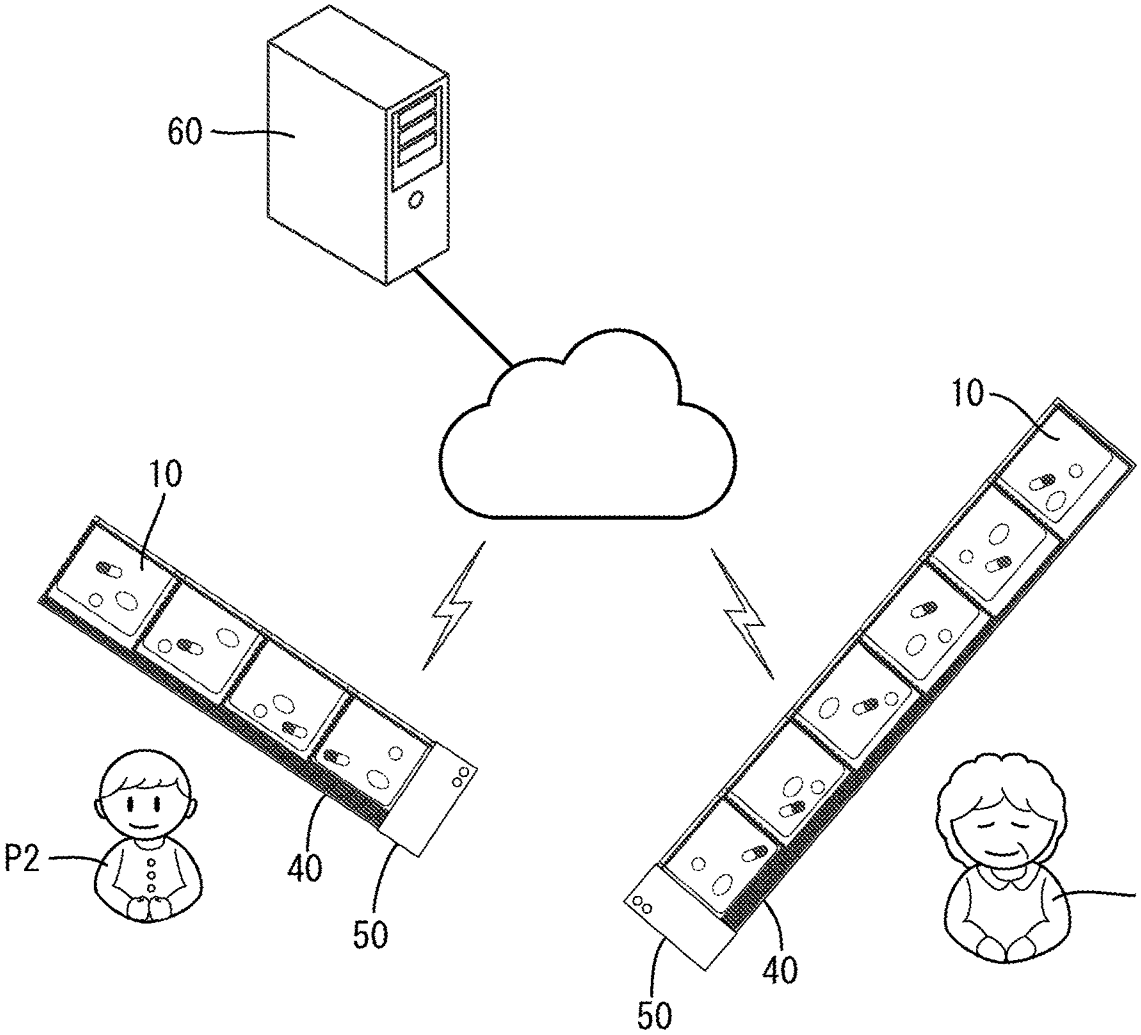
FIG. 6 is a typical view illustrating an example in which opening of the subdivided bag is detected.

Such a subdivided bag 40 formed with using the packaging material 10 can be used in a medication instruction system illustrated in FIG. 6, for example. Specifically, when the subdivided bag 40 is connected to the opening detector 50, the control section 52 sends a signal to one terminal (for example, the first terminal T1) that is connected to the connection terminal section 51 and detects the signal via the connection terminal section 51 that is connected to another terminal (for example, the second terminal T2) and thus detects an electrically conductive state between the first terminal T1 and the second terminal T2. In FIG. 6, no storing portions 42 (the number of storing portions 42 is n) of the user P1's subdivided bag 40 is opened and the first terminal T1 and the second terminals T2 are electrically conductive. Then, the control section 52 of the user P1's opening detector 50 detects the electrically conductive state between the first terminal T1 and each of the second terminals T2 and stores the detection results and the time information in the storing section M. With respect to the user P2's subdivided bag 40, the medicine is taken two times and the two storing portions 42 are cut away. If the n-th storing portion 42*n* from the first direction-side end is opened, at least portions of the first line 31 and the second line 32*n* that surround the storing portion 42*n* and are disposed at a peripheral portion of the storing portion 42*n* are broken together with the sheet 20. As a result, the electrical connection between the first terminal T1 and the second terminals T2 is disconnected. More specifically, the first terminal T1 is electrically connected to the second terminals T21 to T24 but the electrical connection between the first terminal T1 and each of the second terminals T25, T26 is disconnected. The control section 52 of the user P2's opening detector 50 detects the disconnection between the first terminal T1 and the second terminals T2 and stores the detection result and the time information in the storing section M.

The information related to the opening detection results obtained by the opening detector 50 can be, for example, transmitted to a management server 60 of the medication instruction system with wired connection or wireless connection. Accordingly, the user P1, P2 can receive appropriate medication instructions based on their medication records.

The packaging material 10 previously described includes the sheet 20 including the pre-storing portions 21, 22 that are to form the storing portions 42 storing the medicine Med (stored object) and the wiring pattern 30 disposed on the sheet 20. The wiring pattern 30 is disposed such that ends of the wiring pattern 30 are on the first direction side (one side) along the elongated direction (one direction). The wiring pattern 30 is disposed with respect to the pre-storing portion 22 so as to extend along three peripheral edges of the storing portion 42 except for the first direction-side edge when the storing portion 42 is formed from the pre-storing portion 22.

According to the above configuration, the wiring pattern 30 is disposed to surround each of the storing portions 42 from three directions. Two ends of the line that surrounds each storing portion are disposed at the first direction-side end of the sheet 20 and can be connected to a target easily with the opening detector 50. Accordingly, the physical change can be detected. When the sheet 20 of the subdivided bag 40 that is formed with using the packaging material 10 is torn to take out the medicine Med from any one of the storing portions 42, the sheet 20 may be broken with various ways as described below. The storing portion 42 may be torn completely along a line crossing the storing portion 42 along the width direction (refer to a line C2 in FIG. 1). The storing portion 42 may be torn from one side to an intermediate portion with respect to the width direction. The storing portion 42 may be torn obliquely from one side to the second direction-side end with respect to the width direction (refer to a line C3 in FIG. 1). In any of the above breaking ways, the wiring pattern 30 is broken together with the sheet 20. The physical change (for example, the electrical conductive properties of the wiring pattern 30 that surrounds the storing portion 42) occurs due to the breakage of the wiring pattern 30. Based on the physical change, the breakage of the sheet 20 in the storing portion 42 (in other words, the opening of the subdivided bag 40) can be detected.

In the above packaging material 10, the sheet 20 is transparent or semitransparent and includes the pre-sealing portions 24 around the pre-storing portions 21, 22. The wiring pattern 30 is arranged on the pre-sealing portions 24 that are peripheral edges of the pre-storing portion 22 on the three direction sides (the second direction, the third direction, the fourth direction). According to such a configuration, the pre-storing portions 21, 22 and the storing portions 42 are transparent or semitransparent and the wiring pattern 30 is arranged so as not to overlap the pre-storing portions 21, 22 and the storing portions 42. Accordingly, the subdivided bag 40 that is formed with using the packaging material 10 can have a configuration in which the medicine Med stored in the storing portion 42 is less likely to be blocked by the wiring pattern 30 and the medicine Med can be seen from outside. This is particularly effective for the subdivided bag 40 with which several kinds of medicines Med are packed in each storing portion 42.

With respect to the packaging material 10, the subdivided bag 40 has a belt shape and includes the storing portions 42 that are arranged along the elongated direction (the one direction). The sheet 20 has a belt shape and includes the pre-storing portions 21, 22 that are arranged along the elongated direction. The wiring pattern 30 is disposed such that ends of the wiring pattern 30 are disposed on the first direction side (one direction) along the elongated direction. The wiring pattern 30 extends along three peripheral edges (the second direction side, the third direction side, the fourth direction side) of each of the storing portions 42 with respect to the pre-storing portions 21, 22. The wiring pattern 30 includes the first line 31 and the second lines 32. The first line 31 is disposed on the third direction-side (one side with respect to the width direction that crosses the elongated direction) with respect to the storing portions 42 and extends along the elongated direction. The second lines 32 are disposed on the fourth direction-side (another side with respect to the width direction) with respect to the storing portions 42 and extend along the elongated direction. The first line 31 is a common line that is provided commonly for the storing portions 42 and extends along the peripheral edges of the storing portions 42. According to such a configuration, unlike the second lines 32*a*, 32*b*, . . . 32*n* that are arranged parallel to each other, the first line 31 needs only a small area to be arranged. Therefore, with the wiring pattern 30 being arranged on the pre-sealing portions 24, the ratio of the areas of the pre-sealing portions 24 to the sheet 20 can be reduced. As a result, the ratio of the areas of the pre-storing portions 21, 22 to the sheet 20 (namely, the ratio of the areas of the storing portions 42 to the subdivided bag 40) can be increased and this improves the storage ability and the visibility of the stored objects.

With respect to the subdivided bag 40 formed with using the above packaging material 10, the breaking lines C1 including cut portions at intervals extend between the adjacent storing portions 42 along the width direction. In the packaging material 10, the width of the narrowest portion of the wiring pattern 30 is greater than the length of the cut portion of the breaking line C1. With such a configuration, when the breaking line C1 is formed in the subdivided bag 40 that is formed with using the packaging material 10, the wiring pattern 30 is less likely to be broken by forming the breaking line C1. When one storing portion 42*n* is separated from the subdivided bag 40, the storing portions 42 that are adjacent to each other with sandwiching the breaking line C1 are easily separated and other storing portion 42(*n*−1) is less likely to be erroneously opened.

The packaging material 10 includes the pre-sealing portions 24 around the pre-storing portions 21, 22. The sheet 20 includes the folding line L1 that extends along the elongated direction in a middle with respect to the width direction. The sheet 20 is divided by the folding line L1 into the first section A1 that is on one side and the second section A2 that is on another side with respect to the width direction. With the sheet 20 being folded in half along the folding line L1, the pre-sealing portions 24 in the first section A1 and the pre-sealing portions 24 in the second section A2 are bonded to each other and the storing portions 42 are formed. According to such a configuration, the subdivided bag 40 is easily formed from one sheet 20.

Second Embodiment

Figure 7:
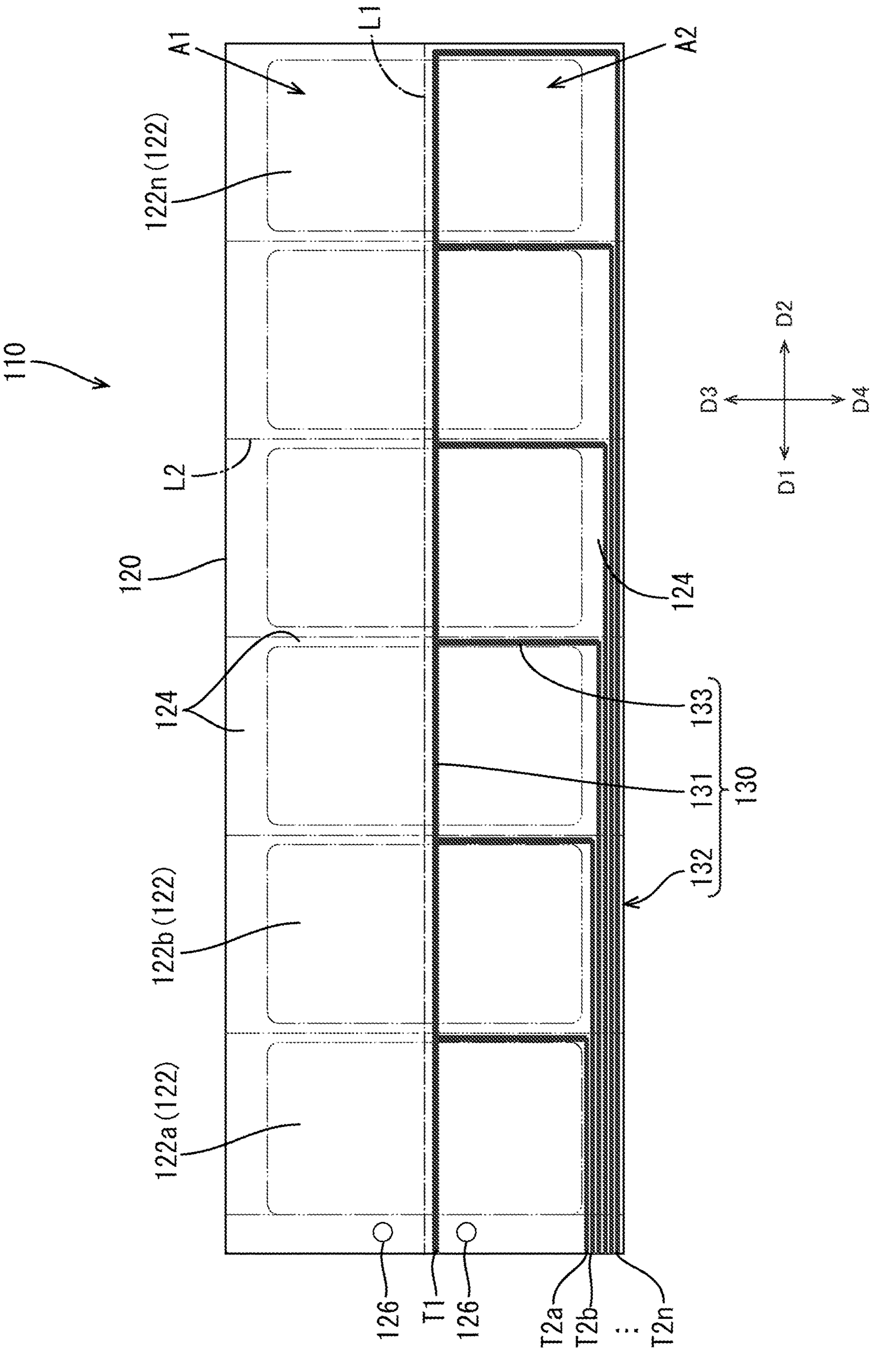
FIG. 7 is a plan view of a packaging material according to another embodiment.

A packaging material 110 according to a second embodiment will be described with reference to FIG. 7. The packaging material 110 according to the second embodiment includes pre-storing portions 122. The pre-storing portion 122 has a shape that is formed by connecting the pre-storing portion 21 and the pre-storing portion 22 of the first embodiment in the width direction. The packaging material 110 includes two circular holes 126 in the mount section 28. The circular holes 126 are arranged symmetrically with respect to the folding line L1. Other configurations are similar to those of the first embodiment and the configurations, operations, and effects similar to those of the first embodiment will not be described.

Specifically, the pre-storing portions 122 of the packaging material 110 have a rectangular shape that is elongated in the width direction. Therefore, the pre-sealing portion extending in the elongated direction is not provided in a middle with respect to the width direction. The folding line L1 and a first line 131 extend to cross the pre-storing portions 122. The pre-storing portion 122 is disposed symmetrically with respect to the folding line L1. The pre-storing portion 122 is about twice as large as the storing portion.

The packaging material 110 includes pre-sealing portions 124 around the pre-storing portions 122. A sheet 120 includes the folding line L1 that extends along the elongated direction in a middle with respect to the width direction. The sheet 120 is divided by the folding line L1 into the first section A1 that is on one side and the second section A2 that is on another side with respect to the width direction. With the sheet 120 being folded in half along the folding line L1, the pre-sealing portions 124 in the first section A1 and the pre-sealing portions 124 in the second section A2 are bonded to each other and the storing portions 42 are formed. The two circular holes 126 are overlapped with each other and one circular hole is formed. A columnar projection included in the opening detector 50 can be inserted through the circular hole.

According to such a configuration, with the sheet 120 being folded in half, three peripheral edge portions of the pre-storing portion 1222 except for one peripheral edge close to the folding line L1 are bonded and the storing portion 42 can be enclosed. This simplifies a bonding process of bonding the sheet 120 and reduces the area of the pre-sealing portions 124. Eventually, a cost of the packaging material 10 for forming the subdivided bag 40 can be reduced. Furthermore, with the circular holes 126 being included in the mount section 28, the positioning with respect to the opening detector 50 becomes easy and the first terminal T1 and the second terminals T2 of the packaging material 110 can be surely connected to the connection terminal section 51 of the opening detector 50.

Third Embodiment

Figure 8:
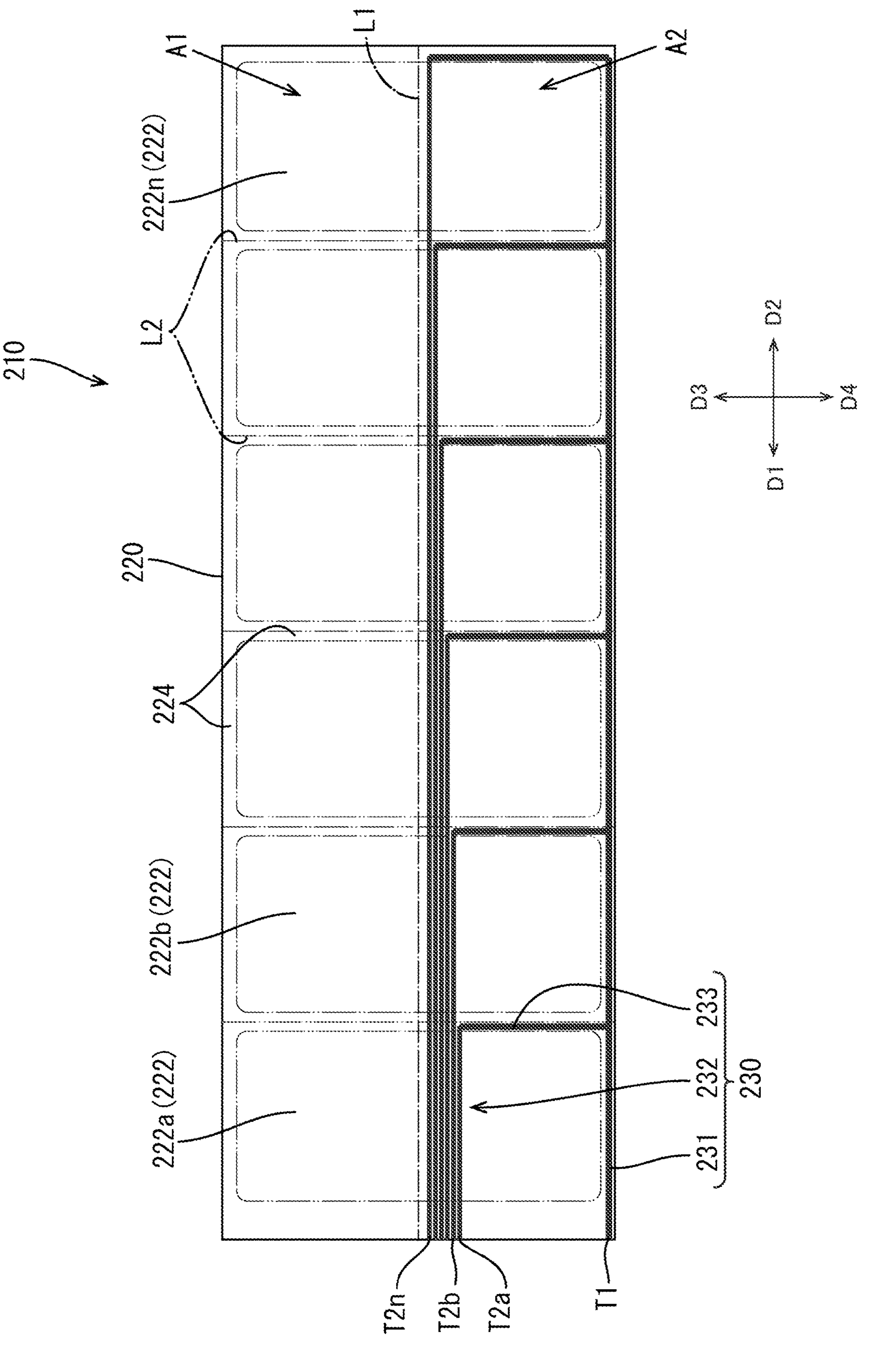
FIG. 8 is a plan view of a packaging material according to another embodiment.

A packaging material 210 according to a third embodiment will be described with reference to FIG. 8. The packaging material 210 of the third embodiment includes a wiring pattern 230 and a wiring arrangement of the wiring pattern 230 differs from that of the first embodiment and the second embodiment. Other configurations are similar to those of the first embodiment and the second embodiment and the configurations, operations, and effects similar to those of the first embodiment and the second embodiment will not be described.

Specifically, the wiring pattern 230 of the packaging material 210 is configured such that positions of a first line 231 and second lines 232 are opposite from the positions of the second embodiment with respect to the width direction. With such a configuration, the frequency that the second lines 232 are disposed on a pre-sealing portion 224 can be reduced. Accordingly, when the subdivided bag 40 is formed from the packaging material 210, the wiring pattern 230 is less likely to be thermally affected.

Fourth Embodiment

Figure 9:
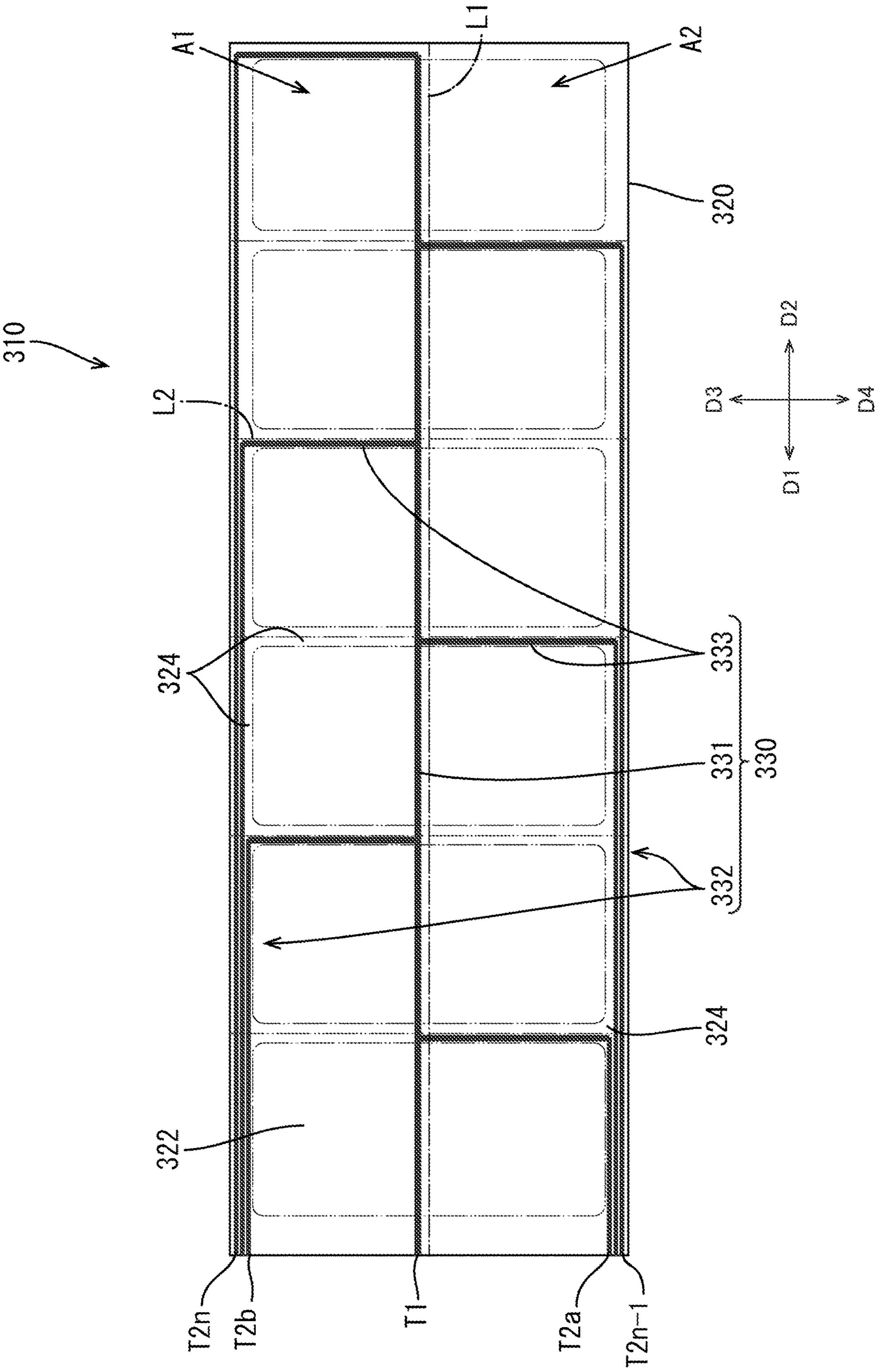
FIG. 9 is a plan view of a packaging material according to another embodiment.

A packaging material 310 according to a fourth embodiment will be described with reference to FIG. 9. The packaging material 310 of the fourth embodiment includes a wiring pattern 330 and a wiring arrangement of the wiring pattern 330 differs from that of the first to third embodiments. Other configurations are similar to those of the first to third embodiments and the configurations, operations, and effects similar to those of the first to third embodiments will not be described.

Specifically, in the first to third embodiments, the first lines 31, 131, 231 and the second lines 32, 132, 232 are on the same side with respect to the folding line L1 on the sheets 20, 120, 220. In the packaging material 310 according to the fourth embodiment, some second lines 332 and third lines 333 are disposed on one side (third direction-side, in an A1 section) and another second lines 332 and third lines 333 are on another side (fourth direction-side, in an A2 section) with respect to the folding line L1 in the width direction of the sheet 20. For example, the positions of the second lines 332 and the third lines 333 disposed around the respective pre-storing portions 322 that are adjacent to each other are opposite from each other with respect to the folding line L1. According to such a configuration, with the second lines 332 being disposed on the pre-sealing portion 324, a width dimension of the pre-sealing portions 324 at two edges of the sheet 320 with respect to the width direction can be reduced. The width of the second lines 332 or a space between the adjacent second lines 332 can be increased.

Fifth Embodiment

Figure 10:
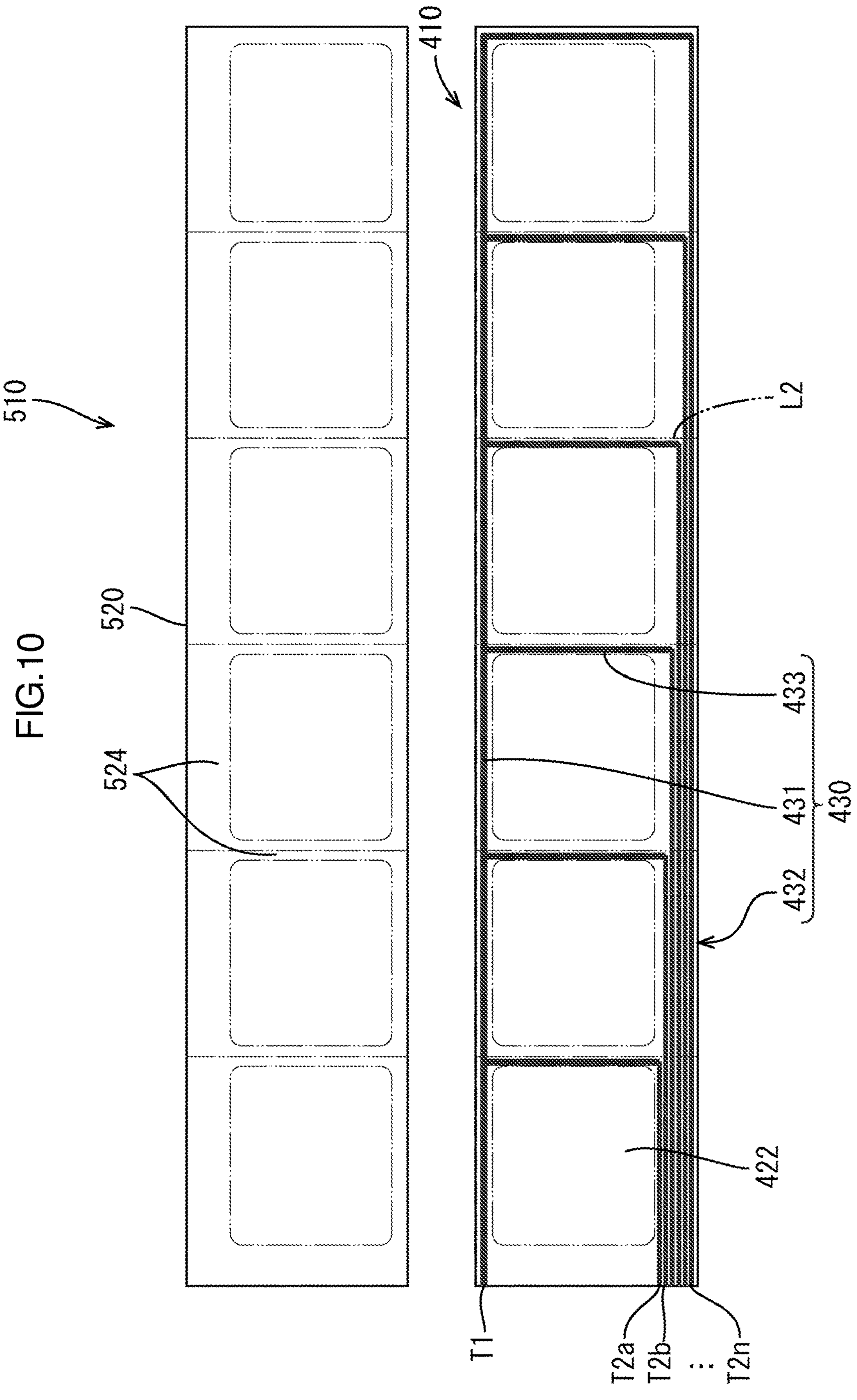
FIG. 10 is a plan view of a packaging material according to another embodiment.
Figure 11:
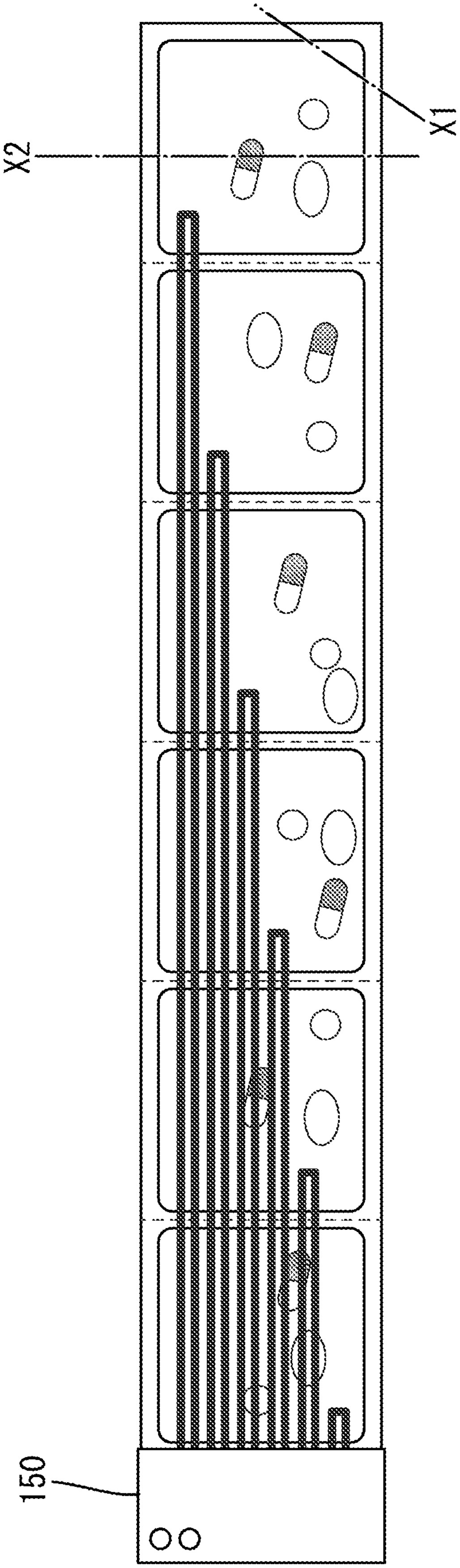
FIG. 11 is a subdivided bag that is formed with a packaging material according to a reference example and whose opening is being detected.

A packaging material 410 according to a fifth embodiment will be described with reference to FIG. 10. The fifth embodiment includes the packaging material 410 and another packaging material 510 to form the subdivided bag 40. The size of the packaging material 410 differs from that of the first to fourth embodiments. Other configurations are similar to those of the first to fourth embodiments and the configurations, operations, and effects similar to those of the first to fourth embodiments will not be described.

Specifically, in the first embodiment, for example, the dimension of the sheet 20 measured in the width direction is about twice as the dimension of the pre-storing portion 21 (namely, the dimension of the subdivided bag 40 and the storing portion 42) measured in the width dimension such that the sheet 20 is folded in half to form the subdivided bag 40. The packaging material 410 of the fifth embodiment has a shape obtained by cutting the sheet 20 of the first embodiment along the folding line L1. In forming the subdivided bag 40, the packaging material 410 and the sheet 520 (which may be same as the sheet 420) without including the wiring pattern 430 are bonded at pre-sealing portions 424, 524 that are included in four edge portions of the respective pre-storing portions 421, 521 and the storing portions 42 are formed. According to such a configuration, the wiring pattern 430 need not be disposed on the packaging material 510 and therefore, a conventional belt-shaped packaging paper can be used. Accordingly, a cost of the packaging material 10 for forming the subdivided bag 40 can be reduced.

Preferred embodiments of the present disclosure are described with reference to the drawings; however, the technology described herein is not limited to the above embodiments. It is obvious for those having skills in the field of the technology described herein to achieve various modifications or alternations within the technological scope of the present invention and such modifications and alternations are included in the technological scope of the present disclosure. For example, the following embodiments may be included in the technical scope of the present invention.

(1) In the above embodiments, the sheet includes multiple pre-storing portions and has a belt shape. However, the sheet may include only one pre-storing portion and may not have a belt shape. In such a configuration, the sheet may have a wide shape that is greater in the width direction that is perpendicular to the one direction than in the one direction.

(2) In the above embodiments, a thin member (which may be a paper) including fibers such as glassine and cellophane is used as a base; however, the base may not necessarily include fibers but may be a synthetic resin sheet. The synthetic resin sheet used as the base may preferably have heat resistant properties with respect to the heating temperature in the forming of the bag and the sealing.

(3) In the above embodiments, the wiring pattern 30 is disposed on the surface of the sheet 20 (the surface of the base). The wiring pattern may be disposed on a back surface of the sheet 20 (a surface of thermoplastic resin disposed on the base) as long as the opening can be detected with the wiring pattern that is disposed at a peripheral edge of one storing portion when the storing portion is opened.

(4) In the first and fifth embodiment, the wiring patterns 30, 430 are entirely disposed on the pre-sealing portions 24, 424. However, when the bag is actually formed, a portion of the wiring pattern 30, 430 is allowed to be disposed outside the sealing portions. A portion of the wiring pattern 30, 430 may be disposed outside the pre-sealing portion 24, 424 as long as the object of the present technology is achieved.

EXPLANATION OF SYMBOLS

10, 110, 210, 310, 410: packaging material, 20, 120, 220, 320, 420: sheet, 21, 21*a*, 21*b* . . . 21*n*, 22*a*, 22*b* . . . 22*n*, 122, 222: pre-storing portion, 24, 124, 224, 324, 424: pre-sealing portion, 30, 130, 230, 330, 430: wiring pattern, 31, 131, 231, 331, 431: first line, 32, 132, 232, 332, 432: second line, 33, 133, 233, 333, 433: third line, 40: subdivided bag, 42, 42*a*, 42*b* . . . 42*n*: storing portion, 50: opening detector, C1: breaking line, C2: cut portion (cut line), L1: folding line, L2: pre-breaking line, L3: length (cut length), L4: length, Med: medicine (stored object)

The invention claimed is:

1. A packaging material used for forming a subdivided bag including a storing portion that stores an object, the packaging material comprising:

a sheet including a pre-storing portion to be the storing portion; and a wiring pattern disposed on the sheet, wherein the wiring pattern is disposed such that ends of the wiring pattern are disposed on one side along one direction and the wiring pattern is disposed with respect to the pre-storing portion so as to be along peripheral edges of the storing portion on three sides other than the one side with the storing portion being formed, the subdivided bag has a belt shape and the storing portion includes storing portions that are arranged along the one direction, the sheet has a belt shape and the pre-storing portion includes pre-storing portions that are arranged along the one direction, the wiring pattern is disposed such that the ends of the wiring pattern are disposed on the one side along the one direction and the wiring pattern is disposed along peripheral edges of the storing portions on the three sides when the storing portions are formed, the wiring pattern includes a first line that is disposed on one side with respect to the storing portions in a width direction that crosses the one direction and a second line that is disposed on another side in the width direction when the storing portions are formed, the first line and the second line extend along the one direction, and at least one of the first line and the second line is a common line that is commonly disposed along the peripheral edges of the storing portions.

2. The packaging material according to claim 1, wherein the sheet is transparent or semitransparent and includes a pre-sealing portion around the pre-storing portion, and the wiring pattern is disposed at peripheral edges of the pre-storing portion on the three sides and disposed on the pre-sealing portion.

3. The packaging material according to claim 1, wherein a breaking line is between the storing portions that are adjacent to each other when the storing portions are formed, the breaking line includes cut portions at intervals, and a narrowest portion of the wiring pattern has a width that is greater than a length of one of the cut portions.

4. The packaging material according to claim 1, further comprising pre-sealing portions around the pre-storing portions, wherein the sheet includes a folding line extending along the one direction in a middle of the sheet with respect to a width direction that crosses the one direction, the sheet is divided by the folding line into a first section that is on one side and a second section that is on another side with respect to the width direction, and with the sheet to be folded in half along the folding line and the pre-sealing portion in the first section and the pre-sealing portion in the second section to be bonded, the storing portion is formed.

5. The packaging material according to claim 1, further comprising pre-sealing portions around the pre-storing portions, wherein with the sheet and another sheet being overlapped, the pre-sealing portions of the sheets are to be bonded to each other and the storing portion is to be formed.

6. A subdivided bag having at least four edges, the subdivided bag comprising:

a storing portion that stores an object; and a wiring pattern disposed such that ends of the wiring pattern are disposed on a first edge of the at least four edges, the wiring pattern extending around the storing portion and along three edges of the at least four edges except for the first edge, wherein the subdivided bag has a belt shape and the storing portion includes storing portions that are continuously arranged in an elongated direction, the wiring pattern is disposed such that the ends of the wiring pattern are disposed on the first edge along the elongated direction and the wiring pattern is disposed along peripheral edges of the storing portions on the three edges, the wiring pattern includes lines that are provided corresponding to the storing portions, respectively, the wiring pattern includes a first one of the lines that is disposed on one side with respect to the storing portions in a width direction that crosses the elongated direction and a second one of the lines that is disposed on another side in the width direction, the first line and the second line extending along the elongated direction, and at least one of the first one of the lines and the second one of the lines is a common line that is commonly disposed along the peripheral edges of the storing portions.

7. The subdivided bag according to claim 6, wherein each of the storing portions has at least four edges including a first edge that is parallel to the first edge of the subdivided bag, the storing portions are continuously arranged such that the first edges of the storing portions are parallel to each other and the storing portions are able to be separated from each other, two ends of each of the lines are disposed on the first edge of the subdivided bag, and each of the lines extends along the three edges of each of the storing portions except for the first edge of each of the storing portions.

8. The subdivided bag according to claim 7, wherein the at least four edges of each of the storing portions include a second edge that is opposite the first edge and a third edge and a fourth edge that are between the first edge and the second edge and extend parallel to each other, the storing portions at least include a first storing portion that is closest to the first edge of the subdivided bag and a second storing portion that is next to the first storing portion in the elongated direction, the lines include a first surrounding line that surrounds the first storing portion and extends from one of the two ends along the third edge, the second edge, and the fourth edge of the first storing portion to another one of the two ends, and the lines include a second surrounding line that extends from one of the two ends along the third edge of the first storing portion, the third edge, the second edge, and the fourth edge of the second storing portion, and the fourth edge of the first storing portion to another one of the two ends.

* * * * *